United States Patent
Hodges

(10) Patent No.: US 12,085,286 B2
(45) Date of Patent: Sep. 10, 2024

(54) PHOTOVOLTAIC WATER HEATING CONTROL SYSTEM AND PROCESS

(71) Applicant: GreenPWR LLC, Palatine, IL (US)

(72) Inventor: Mitchell James Hodges, Palatine, IL (US)

(73) Assignee: GreenPWR Inc, Palatine, IL (US)

( * ) Notice: Subject to any disclaimer, the term of this patent is extended or adjusted under 35 U.S.C. 154(b) by 471 days.

(21) Appl. No.: 17/536,451

(22) Filed: Nov. 29, 2021

(65) Prior Publication Data

US 2022/0170648 A1    Jun. 2, 2022

Related U.S. Application Data

(60) Provisional application No. 63/118,885, filed on Nov. 28, 2020, provisional application No. 63/118,886, filed on Nov. 28, 2020.

(51) Int. Cl.
| | | |
|---|---|---|
| *F24D 19/10* | (2006.01) | |
| *G05F 3/08* | (2006.01) | |
| *H02J 3/00* | (2006.01) | |
| *H02J 3/38* | (2006.01) | |

(52) U.S. Cl.
CPC ........... *F24D 19/1057* (2013.01); *G05F 3/08* (2013.01); *H02J 3/003* (2020.01); *H02J 3/381* (2013.01); *F24D 2200/02* (2013.01); *H02J 2203/10* (2020.01); *H02J 2300/24* (2020.01)

(58) Field of Classification Search
CPC .... F24D 19/1057; F24D 2200/02; G05F 3/08; H02J 3/003; H02J 3/381; H02J 2203/10; H02J 2300/24; H02J 2300/10
USPC ........ 126/536; 219/482, 483, 487, 490, 494, 219/497; 392/441, 447, 451, 497, 498
See application file for complete search history.

(56) References Cited

U.S. PATENT DOCUMENTS

| | | |
|---|---|---|
| 8,909,033 B2 | 12/2014 | Kreutzman |
| 9,453,658 B2 | 9/2016 | Kreutzman |
| 10,066,851 B2 | 9/2018 | Kreutzman |

(Continued)

FOREIGN PATENT DOCUMENTS

| | | | |
|---|---|---|---|
| WO | 2014152893 A2 | 9/2014 | |
| WO | WO-2015121856 A1 * | 8/2015 | ......... F24D 17/0021 |

(Continued)

OTHER PUBLICATIONS

International Search Authority Report and Written Opinion issued in corresponding foreign application, PCT/US21/60962, pp. 1-11 (Mar. 24, 2022).

*Primary Examiner* — Allen R. B. Schult
*Assistant Examiner* — William C Weinert
(74) *Attorney, Agent, or Firm* — UB Greensfelder LLP; Benjamin D. Rotman

(57) ABSTRACT

This invention provides a system and process to optimize photovoltaic (PV), grid, and other electricity in powering an electric water heater. The system comprises a photovoltaic (PV) controller coupled to a plurality of power input sources and heating elements wherein the heating elements immersed in an electric immersion heater water tank. The PV controller is further configured with control circuitry having an operating efficiency routine calculating optimal use cases from a variety of installation parameters and learned parameters to determine the appropriate power input source and switch between sources accordingly.

16 Claims, 5 Drawing Sheets

(56) References Cited

U.S. PATENT DOCUMENTS

| | | | |
|---|---|---|---|
| 10,571,135 B2 | 2/2020 | Kreutzman | |
| 2005/0143865 A1* | 6/2005 | Gardner | H02J 13/00002 |
| | | | 700/291 |
| 2012/0090829 A1 | 3/2012 | Deplessis et al. | |
| 2013/0266296 A1 | 10/2013 | Kreutzman | |
| 2014/0265573 A1 | 9/2014 | Kreutzman | |
| 2014/0348493 A1 | 11/2014 | Kreutzman | |
| 2015/0139630 A1 | 5/2015 | Kreutzman | |
| 2015/0354833 A1 | 12/2015 | Kreutzman | |
| 2016/0195284 A1* | 7/2016 | Chaudhry | F24H 15/37 |
| | | | 219/494 |
| 2018/0238563 A1 | 8/2018 | Stepa et al. | |
| 2018/0313578 A1 | 11/2018 | Kreutzman | |
| 2019/0072296 A1 | 3/2019 | Kreutzman | |
| 2019/0074695 A1* | 3/2019 | Motsenbocker | F24H 1/185 |
| 2019/0338962 A1 | 11/2019 | Minnoy | |
| 2020/0389029 A1* | 12/2020 | Minegishi | H02J 3/004 |
| 2021/0231348 A1* | 7/2021 | Or | F24H 4/04 |

FOREIGN PATENT DOCUMENTS

| | | | | |
|---|---|---|---|---|
| WO | WO-2019068132 A1 * | 4/2019 | | F24D 17/0031 |
| WO | WO2019102273 | 5/2019 | | |
| WO | WO-2020212859 A1 * | 10/2020 | | |

\* cited by examiner

PHOTOVOLTAIC WATER HEATING CONTROL SYSTEM AND PROCESS

CROSS REFERENCE TO RELATED APPLICATIONS

The present application claims priority from U.S. Provisional Patent Application No. 63/118,885 filed on Nov. 28, 2020 and U.S. Provisional Patent Application Ser. No. 63/118,886 filed on Nov. 28, 2020 all of which are incorporated in their entirety.

BACKGROUND OF THE INVENTION

The present invention generally relates to the field water heaters. More particularly, the invention relates to a system for providing multiple energy sources to water heaters.

Water heating systems have traditionally been constructed to use fossil fuels, electricity, or solar thermal systems to generate heat and store that heat within water. These water heating systems can include heating elements heating water in storage tanks or be tankless systems which instantly heat water passing through the system. Tankless systems typically have a large energy demand when the water is in use.

Electric immersion water heater systems are constructed of a storage tank with one or two heating elements and thermostat network. These systems vary in power output typically between 1 kW and 5.5 kW for the Unites States market. Heat is generated by passing current through a resistive element which then conducts heat to water. These devices are simple to construct, generally low cost, and are commonly installed in areas where natural gas prices are not competitive with electricity rates.

Energy efficient electric water heaters have had success in the market using heat-pump technology. These devices move heat from its surrounding into water. Although these are simple to install systems, drawbacks include noticeable noise from the internal compressor running, physical size increases due to the additional heat pump mechanics, a large volume of air required around the device to replenish an input heat source, and a slow recovery during high demand times.

Solar thermal systems have been a renewable alternative where a heat collecting array moves energy from the sun to the water being heated, either directly or through a thermal transfer fluid. These systems have limitations and challenges. Direct water heating via solar is limited to regions where freezing is unlikely. The system would be damaged if water were to freeze, and thermal losses become significant with cold ambient temperatures.

Indirect solar thermal systems have been utilized to generate hot water which remedies heat loss to the environment and allows for installations where freezing can occur. These devices use a thermal transfer fluid and require a solar collector, plumbing, a pump, and heat exchanger hot water tank with a backup energy source. Installation is costly and complex with these systems.

The present invention seeks to provide a way to heat water with a backup power source by using several inputs about the installation, water usage profile, energy costs, and weather conditions. By utilizing an array of input parameters, the system will generate hot water for the user at minimal cost and minimal usage of backup energy.

SUMMARY OF THE INVENTION

In view of the above a device, system, and method for efficiently applying multiple electrical inputs to a water heating system is contemplated. The device is part of a complete system to generate hot water. In one aspect, the system comprises a photovoltaic (PV) controller coupled to a plurality of power input sources and heating elements, wherein the heating elements are immersed in an electric immersion heater water tank.

In an additional aspect, the system further comprises a mixing valve coupled the outlet of the water tank configured to reduce and regulate outgoing water temperature.

In yet another aspect the PV controller comprises a PV inverter and input control circuitry wherein the PV inverter is configured to invert the direct current (DC) supplied from PV or Solar cell to alternating current (AC) and the input control circuitry is embedded with an operation efficiency routine and subroutines configured to determine which electrical input should be used to power the heating elements.

In some aspects of the system, the operation efficiency routine and subroutines are configured to use input parameters to determine when to heat the water in the tank and which energy supply to use. The input parameters include but are not limited to pre-determined water usage profiles, system learned water usage profiles, AC grid cost, and weather.

In other aspects of the system feedback mechanisms as part of the operation efficiency routine and subroutines are utilized to correct and adjust the predetermined water usage profiles. Feedback mechanisms may include but are not limited to measuring PV output from previous days and measuring thermostat trip events to adjust the water usage profile to align to the demands of the user.

It is to be recognized by one of skill in the art that the terms "software," "app," "module," "routine," or "subroutine" may be used interchangeably in this specification to describe a software or component parts thereof. In some embodiments of the present invention, each described module or routine/sub-routine is a component part of a larger set of software instructions while in other embodiments each described module or routine/subroutine act as independent software applications. It is also to be recognized by one of skill in the art that the term "database" as used may describe a single specific database, or a sub-section of a larger database.

The methods, systems, apparatuses are set forth in part in the description which follows, and in part will be obvious from the description, or can be learned by practice of the methods, apparatuses, and systems. The advantages of the methods, apparatuses, and systems will be realized and attained by means of the elements and combinations particularly pointed out in the appended claims. It is understood that both the foregoing general description and the following detailed description are exemplary and explanatory only and are not restrictive of the methods, apparatuses, and systems, as claimed.

BRIEF DESCRIPTION OF THE DRAWINGS

In the accompanying figures, like elements are identified by like reference numerals among the several preferred embodiments of the present invention.

Other aspects and advantages of the present invention will become apparent upon consideration of the following detailed description, wherein similar structures have similar reference numerals.

DETAILED DESCRIPTION OF THE PREFERRED EMBODIMENTS

Figure 1:
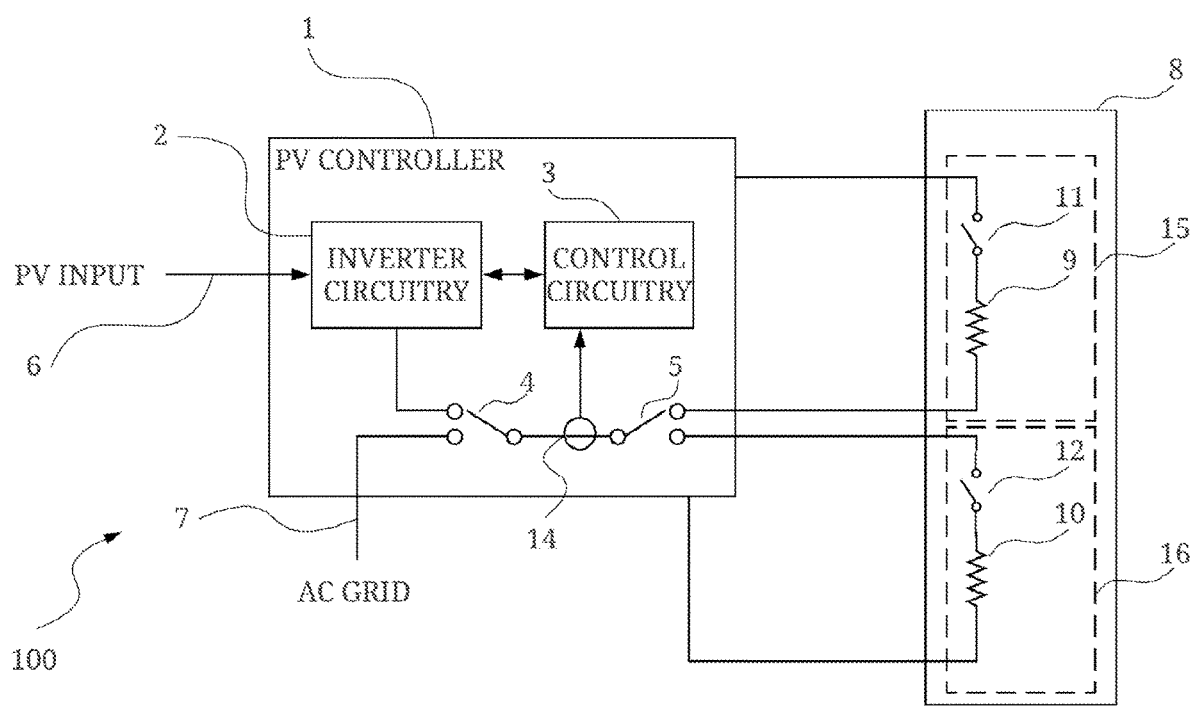
FIG. 1 represents an embodiment of the system.

The foregoing and other features and advantages of the invention will become more apparent from the following detailed description of exemplary embodiments, read in conjunction with the accompanying drawings. The detailed description and drawings are merely illustrative of the invention rather than limiting, the scope of the invention being defined by the appended claims and equivalents thereof As shown in FIG. 1, the system 100 comprises a photovoltaic (PV) controller 1 coupled to a plurality of power input sources 6, 7 and heating elements 9, 10, wherein the heating elements 9, 10 having thermostats 11, 12 are immersed in an electric immersion heater water tank 8. Some variations of the system 100 further comprise a mixing valve (not shown) coupled to the outlet of the water tank 8 configured to reduce and regulate outgoing water temperature.

The PV controller 1 comprises a PV inverter 2 communicatively and electrically coupled to the control circuitry 3. The control circuitry 3 is configured to take readings from the PV inverter 2 to determine the current available PV power output from external PV panels, operate a power input switch (relay switch) 4 that controls whether the PV power input 6 or the grid power input 7 will be supplying power to the heating elements 9, 10, as well as operate a heating element switch 5 to control which heating element 9, 10, is receiving power. The PV controller 1 additionally comprises a current sensor 14 coupled to the control circuity 3 configured to read the operating current of the heating elements 9, 10 or heating element circuits 15, 16.

The control circuitry 3 comprises a processing unit, memory, a means for external communication (for example, but not limited to, a data port or terminal or wireless radio such as but not limited to Wi-Fi, Bluetooth, NFC, or LoRa), and software modules comprising operation efficiency routines 200, 300 and a data input routine including a (GUI). The GUI is configured to allow users to communicate via the web or an app to receive system 100 installation input parameters and updates. The operation efficiency routines 200, 300 and related subroutines are configured to learn system 100 use habits and continually optimize the operation of the system 100 to understand when water is being used, when to heat water, what power source to use to heat water for both cost and demand efficiency.

Further, as shown in FIG. 1, a first power input source (or photovoltaic power input source) 6 may comprise a single PV cell or an array of PV cells outputting direct current (DC) to the PV controller 1 and a second power input source (grid power input) 7 may comprise the AC grid outputting an alternating current (AC) to the PV controller 1. The first power input source 6 is coupled to the PV inverter 2 converting the DC input to an AC output. The first power input source 6 and the second power input source 7 are electrically are isolated through the use of a relay switch 4 controlled by the control circuitry 3. Depending on the system 100 conditions of the operating efficiency routines 200, the control circuitry 3 uses the relay switch to select which power input source 6, 7, the system 100 will use to power the heating elements 9, 10.

In other aspects of the system 100, the system 100 may comprise additional electrical input sources depending on the configuration of the environment. In some examples, the additional power input sources may include, but are not limited to wind energy, hydropower, storage battery, or a generator. These embodiments may either substitute power input sources or become additional power source options coupled to the control circuitry 3 and controlled by relay switch 4.

In embodiments comprising a storage battery, the storage battery may be used to store excess PV energy that is available during scheduled photovoltaic use periods when either the tank water temperature exceeds a predetermined water temperature threshold or the operating efficiency routines 200, 300, determine that the heat need not be applied given the current temperature and the time it will take to heat the water for the predicted use period will still be enough. The storage battery may then be used to provide power to the system 100 at times when photovoltaic energy is not available.

In additional embodiments comprising a storage battery, the storage battery may be used to store excess grid energy that is available during low cost energy periods based on the local grid electricity rate schedule when either the tank water temperature exceeds a predetermined water temperature threshold or the operating efficiency routines 200, 300, determine that the heat need not be applied given the current temperature and the time it will take to heat the water for the predicted use period will still be enough. The storage battery may then be used to provide power to the system 100 at times when photovoltaic energy is not available and at times of high energy cost.

In one aspect of the system 100, the system 100 comprises at least two heating elements 9, 10 electrically coupled to the control circuitry 3. The first heating element 9 of the at least two heating elements 9, 10 is coupled to a first thermostat 11, forming a first heating element circuit 15, disposed in an upper portion of the water tank 8. The second heating element 10 of the at least two heating elements 9, 10 is coupled to a second thermostat 12, forming a second heating element circuit 16, disposed in a lower portion of the water tank 8. The second or lower hearing element 10 is positioned to provide heating to the bulk of the water tank while the first or upper heating element 9 is positioned to heat a small upper section of the water. The first heating element 9 functions to prevent long term stratification and can be exploited to provide a "boost" in heat right before demand is present. Each heating thermostat 11, 12 is preconfigured upon installation with a tripping point temperature. When that temperature reaches the tripping point, the respective thermostat 11, 12 is tripped and the circuit is opened and the respective heating element 9, 10 is no longer powered. When the water temperature naturally cools to below the tripping point, the respective circuit is closed and the respective heating element 9, 10 can again receive power.

In other aspects of the system 100, the system may only comprise a single heating element or at least three heating elements throughout the water tank 8. Aspects using a single heating element 10 are generally for use cases where the water tank 8, is small and a single heating element 10 is sufficient to heat the small volume of water. In these embodiments, only a single thermostat 12 is necessary, and the additional heating element switch 5 is unnecessary. In other embodiments, the addition of multiple heating elements may be done for larger water tanks 8, to provide faster heating times, or to further prevent long term stratification.

In these embodiments, each heating element would comprise its own circuit having a thermostat coupled to the heating element switch 5.

Upon installation and setup of the system 100, installation parameters regarding the system 100 setup are entered into the control circuitry 3 memory through the GUI. The input parameters may include but are not limited to the PV panel peak output power (Wp), PV panel tilt (in degrees), possible times of shading of PV panel during the day, azimuth angle (in degrees), heating element power rating (kW), the predetermined water temperature threshold, and number of heaters, and tank volume. These parameters are inputs to the operating efficiency routines 200 to assist in fast convergence to an efficient heat output.

Feedback mechanisms are then utilized by the control circuitry 3 operating efficiency routines 200 to correct any of the installation parameters for actual use case data and allow the system 100 to adapt to solar seasonal variation and water usage variation. In an example feedback mechanism that may be a subroutine of the operating efficiency routines 200, the control circuitry 3 measures PV output power over the course of time, the recorded data is compared to the input parameters, and expected parameters for shade or total panel power capabilities, if the actual data is a mismatch, the subroutine uses the average collected values to overwrite the input parameters. In that example, the control circuitry 3 compares the input parameters to the actual recorded data and overwrites the recorded data with the actual physical state of the hardware in the system 100. In another example of a feedback mechanism subroutine, measured thermostat trip events are recorded by the control circuitry 3 to adjust the water usage profile to align to what the tank is actually demanding. In that example, long periods of closed heating element/thermostat circuits represent periods of constant water use because the water keeps needing to be heated. The control circuitry 3 records that closed circuit time with time and date stamps and can prepare the system to preheat prior to known/predicted use periods or adjust input parameter usage periods to actual usage periods.

Figure 2:
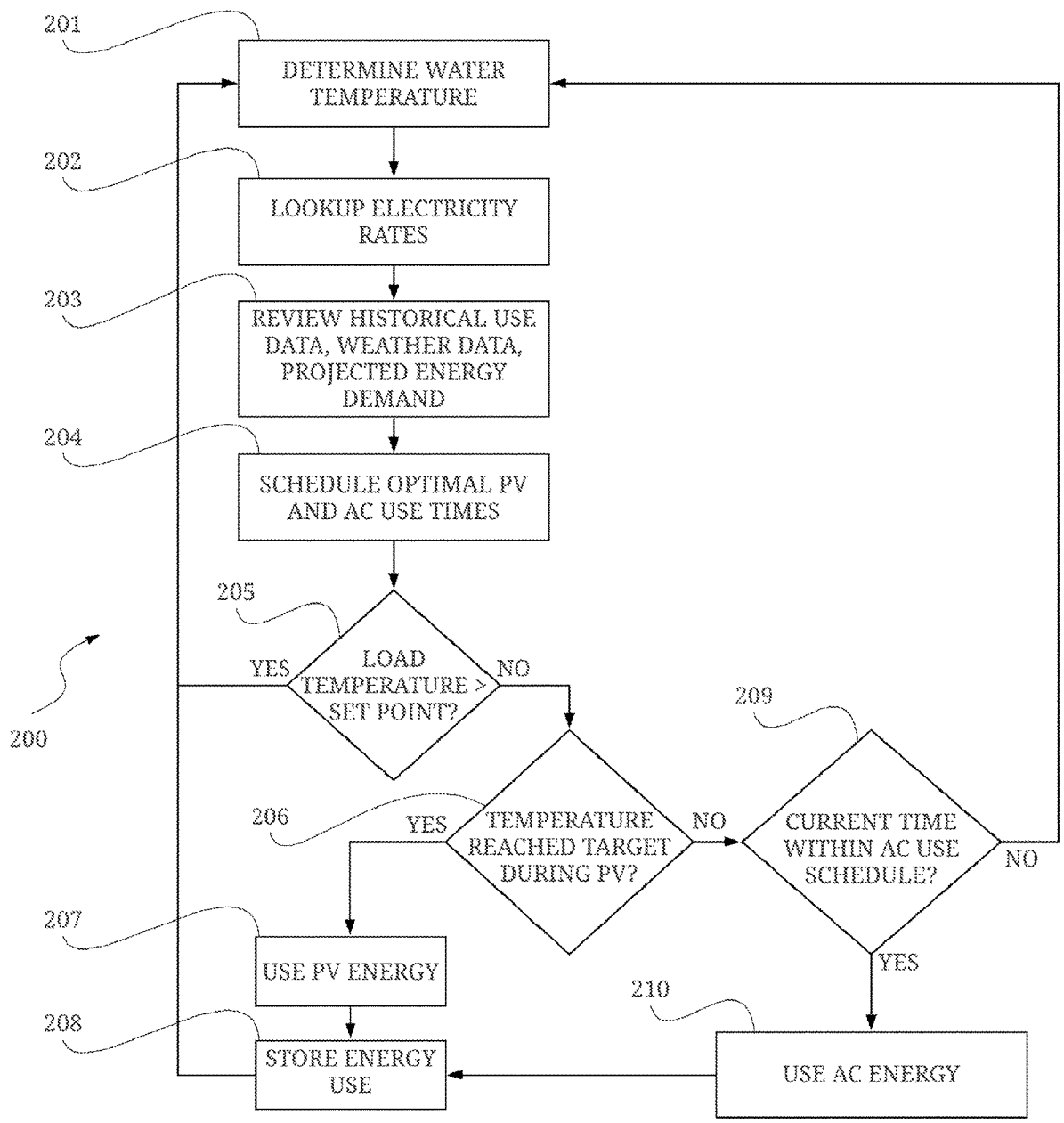
FIG. 2 represents a system operation efficiency routine.
Figure 3:
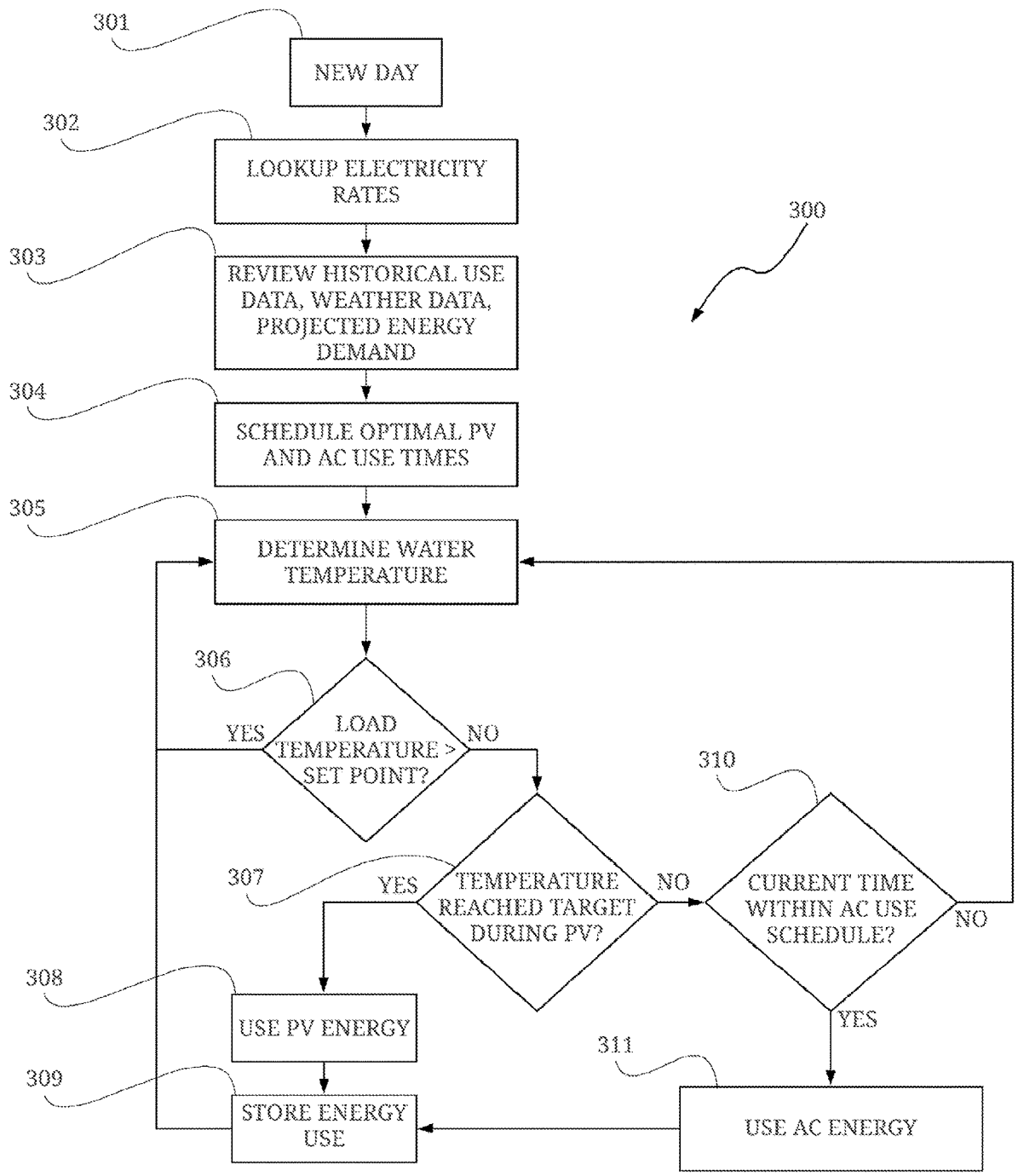
FIG. 3 represents an additional system operation efficiency routine.
Figure 4:
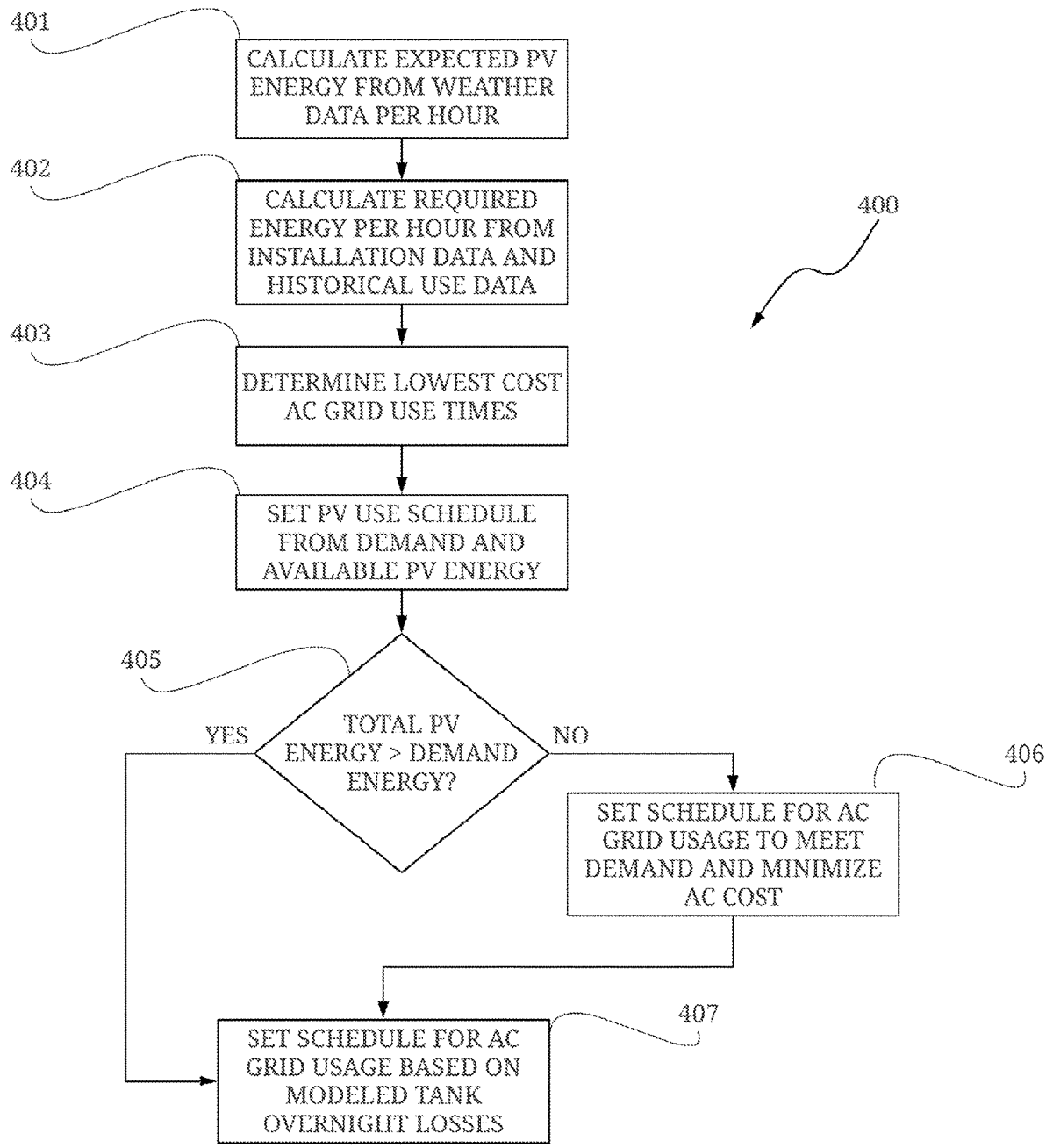
FIG. 4 represents an example system operation efficiency subroutine.

FIGS. 2-4 show an embodiment of the operation of the input control circuitry 3 and operation efficiency routines 200, 300, 400 used to create and revise an efficient and cost effective water heating schedule that complies with an operators water use needs. operation efficiency routines 200, 300, 400 works to determine what the traditional water usage/power requirements are, what the cost of using grid electricity happens to be at the moment or a predicted moment in the future, evaluate weather patterns, and create an optimal mix of grid and PV power use. In embodiments with additional power inputs, the operation efficiency routines 200, 300, 400 are altered with common parameters matching those input sources.

As shown in FIG. 2 the operating efficiency routine 200 uses system 100 first to determine the water temperature 201, look up electricity rates 202, review historical use data, weather data, projected energy demand 203, schedule optimal PV and AC use times 204, determine which power input to use 206, 209, use the power 207, 210, and heat the water/store the thermal energy in the water tank 208. Steps 201-205 may be performed sequentially and in each loop as show in FIG. 2 or as shown in FIG. 3, the each new day steps 202-204, may be performed outside of the temperature feedback loop represented by steps 301-305. In additional embodiments, steps 202, 203, 302, and 303, may be performed concurrently as opposed to sequentially.

The look up electricity rates, review historical use data, weather data, projected energy demand step 203, 303, are data acquisition steps used by the operating efficiency routine 200, 300 to perform the schedule optimal PV and AC use times step 204, 304. In the look up electricity rates step 202, 302 the operating efficiency routine 200, 300 uses the control circuitry 3 means of communication to connect to the rate tables set by the local power company and record the grid electricity rate schedule. The rate tables are imported into the control circuitry memory and used to determine when it is least expensive to use grid electricity. The rate table may be inputted manually through the GUI or obtained through an API or networked server that connects to the local power company.

In the review historical use data, weather data, projected energy demand step 203, 303, the operating efficiency routine 200, 300 uses the control circuitry 3 to review the historical use data or initial input use parameters to calculate how much power is required to heat the water to the load temperature before the predicated use times. Further, the operating efficiency routine 200, 300 uses the control circuitry 3 means of communication to connect to local weather data and import the local weather data to the control circuit memory. The local weather data may be inputted manually through the GUI or obtained through an API or networked server that connects to a local weather data source.

At this step, the system 100 has acquired the power usage needs of the system 100 as well as the predicted times of day that PV will be available and efficient as well as what times grid energy will be most cost effective. The operating efficiency routine 200, 300 next uses the acquired data to schedule optimal PV and AC use times 204, 304.

In the steps of scheduling optimal PV and AC use times 204, 304, the operating efficiency routine 200, 300, uses the calculated power needs to heat to the load temperature in preparation for water usage. In cases where PV power is available for use and at full strength, the operating efficiency routine 200, 300, will default to using PV power as it is most economical and environmentally friendly. In cases where the PV power is not at full strength due to current weather conditions, the operating efficiency routine 200, 300, will calculate how much power is needed for anticipated use at a later time, and determine if the PV supply is enough to appropriately power the heating elements to heat the water for the predicted use time. If the PV supply is less than what is needed, the operating efficiency routine 200, 300, will switch power supplies to the grid supply taking into account the grid supply rate table and supply grid power when cheapest or when necessary. If PV power is not available at all such as at night time or in times of bad weather, the operating efficiency routine 200, 300, will default to the grid power supply and first attempt to heat the water or provide most power at the times with the lowest rate so long as it meets the anticipated water usage time.

FIG. 4 outlines one of the scheduling steps 204, 304, subroutines 400 in creating use case scenarios. As shown in FIG. 4, the subroutine 400 calculates the expected PV power from weather data per hour 401, then calculates the required energy per hour from installation data and historical use data 402, then determines the lowest cost AC grid use times 403, and then sets the PV use schedule from water use demand and available PV energy 404. If the total PV energy is greater than the demand energy to heat the tank 405, the subroutine 400 sets a schedule for AC usage based on the modeled or measured tank overnight losses 407. If the total PV energy is less than the demand energy, the subroutine 400 sets the schedule for AC grid usage to meet the demand to heat the tank and minimize the AC cost 406, and then sets a schedule to for AC grid usage based on modeled or measured tank overnight losses 407.

Returning the operating efficiency routine 200, 300, in operation, the steps of determining the water temperature and load temperature match 201, 205, 305, 306 the operating efficiency routine 200, 300 uses the current sensor 14 through the control circuitry 3 to determine if any of the thermostats 11, 12 are tripped resulting in open heating element circuits. If the current sensor 14 reveals open heating element circuits, the feedback loop notifies the control circuitry 3 that load temperature is met and that no power is needed. The operating efficiency routine 200 continues to monitor for a tripped thermostat 11, 12.

If the current sensor 14 detects a closed circuit, the operating efficiency routine 200, 300 uses the data gathered in the previous process steps 201-204, 301-304 to determine which power supply input 6, 7 would be most efficient and appropriate to use to heat the load temperature. As stated above, and per the schedule generated 204, 304 if the target temperature can be reached using PV energy 207, 307, PV energy will be used 208, 308 and stored in water 209, 309 and the operating efficiency routine 200, 300 will restart itself. If the temperature cannot be reached using PV within the schedule, the operating efficiency routine 200, 300 will check if the AC use meets a current schedule criteria 210, 310 discussed above such as rate time or demand time and use the grid 211, 311 to heat the water and store the energy 209, 309 and the operating efficiency routine 200, 300 will restart itself. If the AC use does not meet a current schedule criteria 210, 310, the operating efficiency routine 200, 300 will restart itself and wait to use power either when PV is available or the AC use schedule is met.

Figure 5:
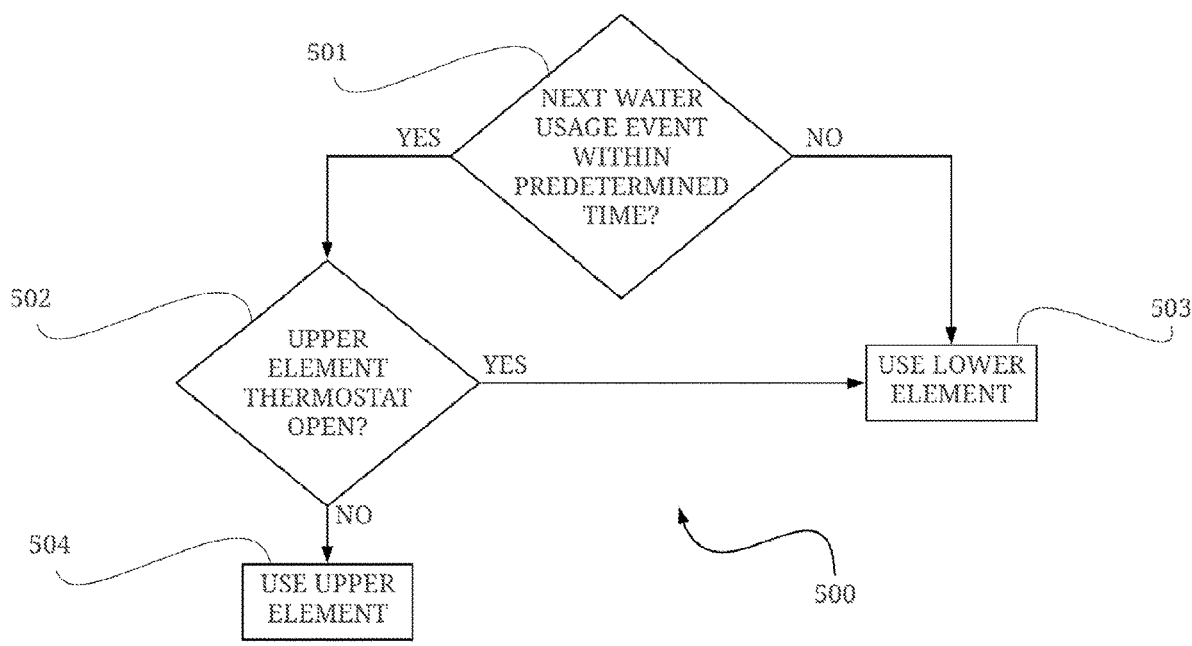
FIG. 5 represents an example system operation efficiency subroutine.

The operating efficiency routine 200, 300, in embodiments with multiple heating elements, may run an additional subroutine 500 to select which heating element 9, 10, to supply power to. As shown in FIG. 5, the heating element selection subroutine 500 goes through the steps of determining whether the next water usage event is within the predetermined or generated usage/time schedule 501, if the event is within the schedule, the subroutine 500, next determines if the upper heating element 9 has an open circuit 502. The subroutine 500 accomplishes this through the heating element switch 5, by switching on the upper heating circuit and activating the current sensor 14 to read active current. If the upper heating element circuit is open, the subroutine 500 recognizes that the upper portion of the tank is at the proper temperature, and switches the switch 5 to the lower heating element 10 to provide a slower long term heat 503. If the upper heating circuit is closed, the subroutine recognizes that the system 100 needs an immediate boost and provides power to heat the upper heating element 9, 504. Ultimately, the system 100 will have a predetermined time where the upper thermostat must be at the predetermined threshold temperature (calculated by the tank volume, estimated current tank temperature, anticipated future usage, heater power rating from the installation parameters, and weather conditions). This time will be just before the demand for hot water is present to have the tank ready.

The operating efficiency routine 200, 300 can be set at to poll/cycle at predetermined time intervals to continually gather data and understand usage patterns.

Those of ordinary skill in the art will understand and appreciate the aforementioned description of the invention has been made with reference to certain exemplary embodiments of the invention, which describe a system, device, and method of use. Those of skill in the art will understand that obvious variations in construction, material, dimensions or properties may be made without departing from the scope of the invention which is intended to be limited only by the claims appended hereto.

The invention claimed is:

1. A photovoltaic water heating control system comprising:
   a photovoltaic power input coupled to a photovoltaic inverter;
   a grid power input;
   at least a first electrical heating element electrically coupled to a first thermostat forming a first heating element circuit, the at least first electrical heating element and first thermostat immersed in a water tank wherein the first thermostat opens the first heating element circuit above a predetermined water temperature threshold and closes the first heating element circuit below the predetermined water temperature threshold, the at least first electrical heating element is disposed towards an upper portion of the water tank;
   at least a second electrical heating element electrically coupled to a second thermostat forming a second heating element circuit, the at least second electrical heating element and second thermostat immersed in the water tank wherein the second thermostat opens the second heating element circuit above a predetermined water temperature threshold and closes the second heating element circuit below the predetermined water temperature threshold, the at least second electrical heating is disposed towards a lower portion of the water tank;
   a photovoltaic controller having control circuitry comprising a processing unit, memory, a means for external communication, and software comprising operating efficiency routines, wherein a set of installation parameters are set in the memory of the control circuitry, the set of installation parameters comprising at least one of the following:
   predetermined water temperature threshold;
   photovoltaic panel peak output power;
   photovoltaic panel tilt angle;
   predicted daytime shading of photovoltaic panel;
   azimuth angle;
   number of heating elements;
   heating element power rating;
   predicted water use periods; or
   water tank volume;
   the photovoltaic inverter and the grid power input coupled to the control circuitry wherein the photovoltaic inverter and the grid power input are isolated through a power input switch controlled by the operating efficiency routines;
   the at least first heating element circuit and the at least second heating element circuit are coupled to a current sensor and the control circuitry through a heating element switch isolating the first heating element circuit from the second heating element circuit;
   wherein the control circuitry determines if a water temperature is above or below the predetermined water temperature threshold by polling the current sensor to detect whether the first heating element circuit is open or closed and wherein the control circuitry through the operating efficiency routines determines a position of the heating element switch to power either the first heating element circuit or the second heating element circuit;
   wherein at least the predetermined water temperature threshold is set in the memory of the control circuitry and the processing unit executes the following operating efficiency routine steps:

determining a current tank water temperature;

determining a grid electricity rate schedule;

analyzing installation parameters, predicted water use periods, predicted weather data, and projected energy demand needed to power the at least first heating element or at least second heating element to meet demands of the predicted water use periods;

preparing an optimal photovoltaic and grid energy use schedule from the installation parameters, the predicted weather data and the grid electricity rate schedule to meet the projected energy demands;

determining if the current tank water temperature is above or below the predetermined water temperature threshold;

wherein if the current tank water temperature is above the predetermined water temperature threshold, the steps of determining a current tank water temperature, determining a current grid electricity rate, analyzing predicted water use periods, and preparing an optimal photovoltaic and grid energy use schedule are repeated;

further wherein if the current tank water temperature is below the predetermined water temperature threshold, the processing unit execute additional operating efficiency routine steps comprising:

analyzing the optimal photovoltaic and grid energy use schedule to determine if use the current tank water temperature exists in a photovoltaic use period or grid use period of the use schedule;

wherein if the current tank water temperature exists in a photovoltaic use period the processing unit switches to the photovoltaic power input to provide photovoltaic energy to the at least first heating element or the at least second heating element, thus heating raising the current tank water temperature; and further wherein if the current tank water temperature exists in a grid electricity use period the processing unit switches to the grid power input to provide grid energy to the at least first heating element of the at least second heating element, thus heating raising the current tank water temperature.

2. The photovoltaic water heating control system of claim 1 wherein the control circuitry further comprises a graphical user interface communicated to an external computing device, through the means for external communication, wherein the graphical user interface is configured to accept the installation parameters and store the installation parameters in memory of the control circuitry.

3. The photovoltaic water heating control system of claim 1 wherein the step of determining a determining a grid electricity rate schedule includes the step of the processing unit to executing the operating efficiency routine to use the means of external communication to connect to a local power company and import the grid electricity rate schedule and store the grid electricity rate schedule in the memory of the control circuitry; and wherein the step of analyzing predicted weather data includes the step of the processing unit executing the operating efficiency routine to use the means of external communication to connect to a local weather service or weather Application Programming Interface (API) and import local weather data and store local weather data as predicted weather data in the memory of the control circuitry.

4. The photovoltaic water heating control system of claim 1 wherein the step of determining if the current tank water temperature is above or below the predetermined water temperature threshold includes the step of the of the processing unit executing the operating efficiency routine to poll the current sensor to monitor whether the first heating element circuit or the second heating element circuit are in an open state.

5. The photovoltaic water heating control system of claim 4 wherein predicted water use periods is an installation parameter and the operating efficiency routine revises the installation parameter with actual use parameters comprising the following steps:

determining current water temperature, if the current water temperature is below the predetermined water temperature threshold, record a first water use time stamp in the memory of the control circuity;

repeat the step of determining the current water temperature until predetermined water temperature threshold is met, record a water use end time stamp in the memory of the control circuit;

record the first water use time stamp and water use end time stamp as an actual use sample in the memory of the control circuit; and compare the actual use sample to the predicted water use periods installation parameter, wherein if the actual use sample falls outside the predicted water use periods installation parameter, add a new actual water use period to the optimal photovoltaic and grid energy use schedule, further wherein if the actual use sample falls before and during or after and during the predicted water use periods installation parameter, adjust a start time of the predicted water use periods installation parameter to the start time of the first water use time stamp or adjust an end time of the predicted water use periods installation parameter to the water use end time stamp.

6. The photovoltaic water heating control system of claim 5 wherein the step of recording the first water use time stamp and water use end time stamp as an actual use sample in the memory of the control circuit further comprises taking an average of actual use samples over a predetermined period of time and recording the average as the actual use sample.

7. The photovoltaic water heating control system of claim 5 wherein the step of preparing the optimal photovoltaic and grid energy use schedule includes the step of calculating a required amount of energy per hour from the installation parameters and actual use parameters, determining a lowest cost grid use time from the grid electricity rate schedule, setting a photovoltaic use schedule from demand energy and available photovoltaic energy wherein if the photovoltaic energy is greater than demand energy required to heat the water tank, setting a schedule for grid energy use based on modeled or measured water tank overnight energy losses, further wherein if the available photovoltaic energy is less than the demand energy, setting a schedule for grid energy usage to meet the demand energy to heat the water tank to minimize grid energy cost based on the lowest cost grid use time and further accounting for modeled or measured water tank overnight energy losses.

8. The photovoltaic water heating control system of claim 1 wherein the steps of determining a grid electricity rate schedule, analyzing predicted water use periods, predicted weather data, and projected energy demand, and preparing an optimal photovoltaic and grid energy use schedule occur before the steps of determining the water temperature and if the current tank water temperature is below the predetermined water temperature threshold.

9. The photovoltaic water heating control system of claim 1 wherein the step of preparing an optimal photovoltaic and grid energy use schedule includes a step of preparing photovoltaic use periods wherein the step of preparing photovoltaic use periods comprises:

the processing unit analyzing the predicted weather data further setting photovoltaic use periods between sunrise and sunset and predicted times of clear weather; or the processing unit, between sunrise and sunset, analyzing maximum photovoltaic power output and comparing the maximum photovoltaic power output to projected energy demands of an upcoming predicted water use period, wherein the processing unit calculates whether the maximum photovoltaic power output applied over a time period before predicted water use period is enough power to meet the projected energy demand, if the maximum photovoltaic power output applied over the time period is period is enough power to meet the projected energy demand a photovoltaic use period is set, if the maximum photovoltaic power output applied over the time period is period is under the power required to meet the projected energy demand a grid use period is set.

10. The photovoltaic water heating control system of claim 9 wherein a storage battery is coupled to the photovoltaic power input and the storage battery stores the photovoltaic energy during photovoltaic use periods when the current water temperature is above the predetermined water temperature threshold or when there is excess time available to use the photovoltaic input prior to the predicted water use period, further wherein the storage battery may be used to power the at least first heating element or the at least second heating element to supplement energy needs.

11. The photovoltaic water heating control system of claim 1 wherein the step of preparing an optimal photovoltaic and grid energy use schedule includes a step of preparing grid use periods wherein step of preparing grid energy use periods comprises:

the processing unit analyzing the predicted weather data further setting grid use periods between sunset and sunrise and predicted times of low sun condition weather; or the processing unit analyzing the grid electricity rate schedule and comparing grid power output and grid electricity rate to the projected energy demands of an upcoming predicted water use period, wherein the processing unit calculates whether the grid power output applied at a time of low power cost period before the predicted water use period is enough power to meet the projected energy demand, if the grid power output applied over the time of low power cost period is enough power to meet the projected energy demand a low cost grid use period is set, if the power output applied over the time of low power cost period is under the projected energy demand a grid use period is set.

12. The photovoltaic water heating control system of claim 11 wherein a storage battery is coupled to the grid power input and the storage battery stores the grid energy during a time of low power cost period when the current water temperature is above the predetermined water temperature threshold or when there is excess time available to use the grid power input prior to the predicted water use period, further wherein the storage battery may be used to power the at least first heating element or the at least second heating element to supplement energy needs.

13. The photovoltaic water heating control system of claim 1 wherein the steps of providing photovoltaic energy or grid energy to the at least first heating element or the at least second heating element includes the steps of operating efficiency routine of switching the heating element switch to the at least first heating element or the at least second heating element through the steps of:

using the current sensor to determine if the first heating element circuit is open;

if the first heating element circuit is open, the heating element switch is switched to the second heating element circuit, if the second heating element circuit is open the operating efficiency routine continues to poll for a closed heating element circuit, if the second heating element circuit is closed, the operating efficiency routine selects a power input source to power the at least second heating element according to conditions set by the optimal photovoltaic and grid energy use schedule; and if the first heating element circuit is closed, the operating efficiency routine selects a power input source to power the first heating element according to conditions set by the optimal photovoltaic and grid energy use schedule.

14. The photovoltaic water heating control system of claim 1 wherein the photovoltaic controller comprises additional power input sources separated by the power input switch including one of the following power input sources: hydropower, wind power, or a generator.

15. The photovoltaic water heating control system of claim 1 the operating efficiency routine revises the installation parameter with actual use parameters comprising the following steps:

measuring a current value of the installation parameter and recording the current value of the current value of the installation parameter as an actual use sample in the memory of the control circuitry;

repeating the step of measuring a current value of the installation parameter and recording the value taking a collective average at different time stamps for each measured installation parameter and recording the collective averages as actual use averages in the memory of the control circuitry; and overwriting the installation parameters with the actual use averages in the memory of the control circuitry; and adjust the optimal photovoltaic and grid energy use schedule to account for the actual use averages.

16. The photovoltaic water heating control system of claim 1 wherein each step is repeated at a predetermined cycle rate.

* * * * *